Patented Dec. 31, 1929

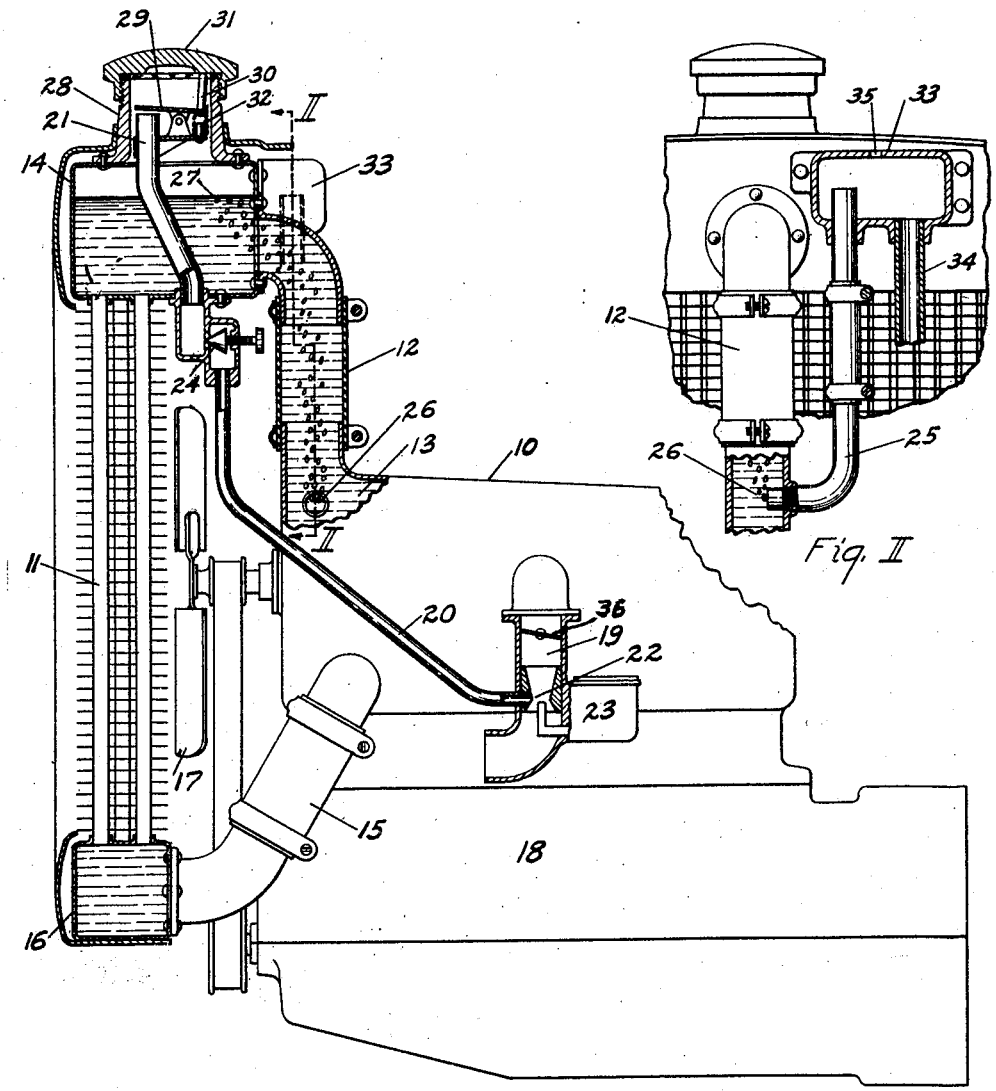
Fig. I
Fig. II
INVENTOR.
Warren T. Hunt

1,741,464

UNITED STATES PATENT OFFICE

WARREN T. HUNT, OF TOLEDO, OHIO, ASSIGNOR TO THE WILLYS-OVERLAND COMPANY, OF TOLEDO, OHIO, A CORPORATION OF OHIO

COOLING SYSTEM

Application filed May 8, 1924. Serial No. 711,933.

My invention relates to improvements in thermo-siphon water cooling systems for internal combustion engines, in which I assist the natural circulation of the water by causing a current of air to flow through a portion of the water in the same direction of flow as that of the water.

One object of the invention is to induce more rapid circulation of the cooling liquid in a thermo-siphon cooling system, and thus provide more efficient cooling of the engine.

Another object is to enable the engine builder to cut down the amount of radiating surface in the radiator while maintaining the same cooling efficiency through the provision of means for causing more rapid circulation of the cooling medium over the radiating surfaces and over the surfaces to be cooled.

Still another object is to assist in the cooling of the liquid by causing bubbles of cool air to pass therethrough.

I illustrate one embodiment of my invention in the accompanying drawing, in which:

Figure I is a part sectional side view of my cooling system applied to an automobile engine, and Fig. II is a part sectional view taken on line II—II of Fig. I, looking in the direction of the arrows at the ends of the section line.

Similar reference numerals refer to similar parts throughout the several views.

In the drawing, I have illustrated the invention in connection with an engine cylinder block 10 and a radiator 11. A substantially vertical tube 12 connects the upper part of the engine cylinder block water jacket 13 with the radiator upper tank 14, another tube 15 connecting the radiator lower tank 16 with the lower part of said water jacket. A fan 17 is employed to induce a current of air through the air passages of the radiator.

The water is heated by the engine 18 while in the water jacket 13, and, due to its increase in volume in proportion to temperature, the water naturally circulates upward in tube 12 into tank 14, downward into the radiator 11, where it is cooled by coming into contact with the cool surfaces of the radiator tubes, and then into tank 16 and through tube 15, back to the water jacket, thus completing its cycle.

I assist and hasten the natural circulation of the water by using the partial vacuum present in the carburetor 19 to create and maintain a partial vacuum in the radiator upper tank 14 by connecting the said tank at a point above the water level, with said carburetor through the tubes 20 and 21. The tube 20 may be attached to any suitable vacuum inducing means, but I prefer to connect it with the carburetor 19 at the venturi 22 below the throttle valve 36, as this is the point of greatest velocity in the engine intake connections, and also because the air entering by way of said tube will least affect the operation of the carburetor 23 when entering at this point. Intermediate the tubes 20 and 21, I have located a casing containing an adjustable valve 24 by means of which the rate of flow of the air through said tubes may be varied. By maintaining a partial vacuum in tank 14, air will be drawn downward through tube 25, from which it will enter the cooling water at 26. On entering the water, the buoyancy of the air causes it to move upward in tube 12, in the form of bubbles which create a mixture of air and water in tube 12 that has a lower specific gravity than the water in radiator 11. The difference in specific gravity between the water and the air and water mixture, produces an upward flow in tube 12 similar to that produced in the well known air-lift pump.

The degree of vacuum in the tank 14, and consequently the amount of air passing through tube 12, will vary with the degree of vacuum at the venturi 22, and as the vacuum at said venturi increases with the speed of the engine 18, additional circulation of the cooling water will be obtained with any increase in the speed of the engine. The venturi 22 should be situated on the upstream, or high pressure, side of the throttle 36 as in this position the air drawn from pipe 20 will vary with the air drawn through venturi 22 and the circulation in the cooling system will be increased when the output of the engine is increased. If the pipe 20 were connected above throttle 36, the moist air would be drawn through the system when the throttle was closed and the engine was doing its least work, thereby increasing the water circulation when it should be decreased. Locating the connection of pipe 20 below the throttle 36 makes the operation of the invention entirely automatic and no adjustments need be made after an initial adjustment of valve 24 in order to adapt the invention to the individual engine requirements. If the heating characteristics of the engine are known valve 24 may be eliminated and a non-adjustable opening of the required size substituted.

The additional circulation obtained may also be varied by varying the distance between the water level 27 and the point of entrance 26 of the air into the vertical tube 12.

In order to prevent water from being drawn into the carburetor 19 when filling the cooling system through the filler connection 28, I have shown a valve 29 normally held open by the pin 30 resting against the filler cap 31 and a spring 32 adapted to automatically close said valve against the end of the tube 21, upon removal of said filler cap. Other means for accomplishing this purpose will readily suggest themselves, however.

The removal of filler cap 31 and the closing of valve 29 will destroy any partial vacuum present in tank 14 and will free the water to back up in tube 25 to a point on a level with the water level 27 in said tank. Any filling of the tank 14 above a level even with the upper end of the tube 25, will cause water to flow out of the upper end of said tube and prevent the submergence of the upper end of the suction tube 21.

Surrounding the upper end of the tube 25, I have provided a receptacle 33 and tube 34 to catch and carry away the overflow water. The receptacle 33 has a vent-hole 35 in the top thereof, to prevent the formation of a siphon.

I claim as my invention:

1. In an internal combustion engine, a cooling fluid circulating system for cooling the engine including a radiator normally closed to the admission of air, a radiator cap, an intake conduit having a throttle valve therein, a pipe leading from the radiator above the fluid level to the conduit at a point on the high pressure side of said throttle valve, means for introducing a gas into the cooling fluid and means cooperative with the cap for sealing the radiator end of said pipe.

2. In an internal combustion engine a fluid circulating system for cooling the engine including a radiator cap, an intake conduit having a throttle valve therein, a venturi within said conduit on the high pressure side of said throttle valve, a pipe connecting the neck of the venturi with the cooling system at a point above fluid level, means for introducing a gas into the circulating system below the fluid level thereof and a trap cooperative with the cap for sealing of the cooling system end of said pipe.

3. In an internal combustion engine, a fluid circulating system for cooling the engine, a fuel intake conduit, a pipe connecting the cooling system from a point above the fluid level with the conduit, a chamber open to the atmosphere provided with a drain tube at its base, and a second pipe connected at one end to the cooling system below the fluid level thereof for admitting air thereto the other end being projected through the base of the chamber and extending upwardly above the level of the drain tube and adapted to act as an overflow for said system during the operation of the engine.

4. In an internal combustion engine, a fluid circulating system for cooling the engine comprising a radiator having a filling opening and a removable cap therefor, a fuel intake conduit, a pipe connecting the interior of the radiator at a point adjacent said opening with said conduit, said pipe having an opening above the fluid level of the system, a valve within said radiator adapted to automatically close the opening to said pipe when the cap is removed, and means for preventing the closing of said valve when said radiator opening is closed by said cap.

In testimony whereof I affix my signature.

WARREN T. HUNT.